US012611747B2

(12) United States Patent
Barron et al.

(10) Patent No.: US 12,611,747 B2
(45) Date of Patent: Apr. 28, 2026

(54) SHOT CASCADING APPARATUS FOR CLEANING 3D PRINTED COMPONENTS

(71) Applicants: Emerson S. Barron, Wentzville, MO (US); Ryan T. Barron, Washington, MO (US)

(72) Inventors: Emerson S. Barron, Wentzville, MO (US); Ryan T. Barron, Washington, MO (US)

( * ) Notice: Subject to any disclaimer, the term of this patent is extended or adjusted under 35 U.S.C. 154(b) by 541 days.

(21) Appl. No.: 17/803,642

(22) Filed: Sep. 15, 2022

(65) Prior Publication Data

US 2023/0330814 A1 Oct. 19, 2023

Related U.S. Application Data

(60) Provisional application No. 63/372,998, filed on Apr. 19, 2022.

(51) Int. Cl.
*B24C 7/00* (2006.01)
*B24C 9/00* (2006.01)
*B33Y 40/20* (2020.01)

(52) U.S. Cl.
CPC .............. *B24C 7/0092* (2013.01); *B24C 9/00* (2013.01); *B33Y 40/20* (2020.01)

(58) Field of Classification Search
None
See application file for complete search history.

(56) References Cited

U.S. PATENT DOCUMENTS

| | | | | |
|---|---|---|---|---|
| 681,867 | A | * | 9/1901 | Bardwell .................. B24C 9/00 451/89 |
| 699,405 | A | * | 5/1902 | Newhouse ............ B24C 7/0046 451/100 |
| 979,897 | A | * | 12/1910 | Steedman ............. B24C 7/0046 451/99 |

(Continued)

FOREIGN PATENT DOCUMENTS

EP 0145851 A1 6/1985

*Primary Examiner* — Monica S Carter
*Assistant Examiner* — Jason Khalil Hawkins
(74) *Attorney, Agent, or Firm* — Sandberg Phoenix & von Gontard, P.C.

(57) ABSTRACT

A shot cascading apparatus for cleaning 3D printed components, generally of any surface debris, such as residue silica from the printing of the component, includes a series of vertically aligned structures, including a shot supply hopper, having a bottom regulated shot gate, for discharging through gravity of metallic shot, into a lower aligned funnel, nested within the bin of a machine base, that allows for surface cleansing of a printed component while achieving a finished product. The supply hopper has a shot gate that is adjustable, for controlling the amount of released shot, and the bottom of the funnel includes a sand separator nozzle, that separates the steel shot from the residue sand, drawing the sand back into the nozzle and conveying it by suction to a location for collection. Beneath the bin is a shot recycle pump, that returns the steel shot back into the supply hopper, for immediate reusage. Various structural support is provided for the hopper, the funnel, and the bin, to maintain the relative degree of separation between these components, to facilitate their usage and operations.

20 Claims, 7 Drawing Sheets

(56) References Cited

U.S. PATENT DOCUMENTS

| | | | | |
|---|---|---|---|---|
| 1,309,671 | A | * | 7/1919 | Weaver .................. B01F 25/83 406/146 |
| 1,858,475 | A | * | 5/1932 | Wolever ............... B24C 7/0046 451/90 |
| 2,365,948 | A | * | 12/1944 | Gossard ............... B24C 7/0092 451/87 |
| 2,566,433 | A | | 9/1951 | Taurman |
| 2,665,119 | A | * | 1/1954 | Broman .................... F23J 3/02 422/216 |
| 2,670,281 | A | | 2/1954 | Hutchison et al. |
| 2,925,145 | A | * | 2/1960 | Hayden .................... C22B 1/08 95/290 |
| 3,553,895 | A | * | 1/1971 | Power .................... B24C 9/003 451/39 |
| 3,596,285 | A | | 7/1971 | Gottwald |
| 4,100,782 | A | | 7/1978 | Clay |
| 4,365,493 | A | | 12/1982 | Feld et al. |
| 4,439,073 | A | * | 3/1984 | White .................. B24C 7/0046 451/100 |
| 5,136,515 | A | | 8/1992 | Helinski |
| 2017/0129074 | A1 | * | 5/2017 | Sulkowski ............. B24C 9/006 |

* cited by examiner

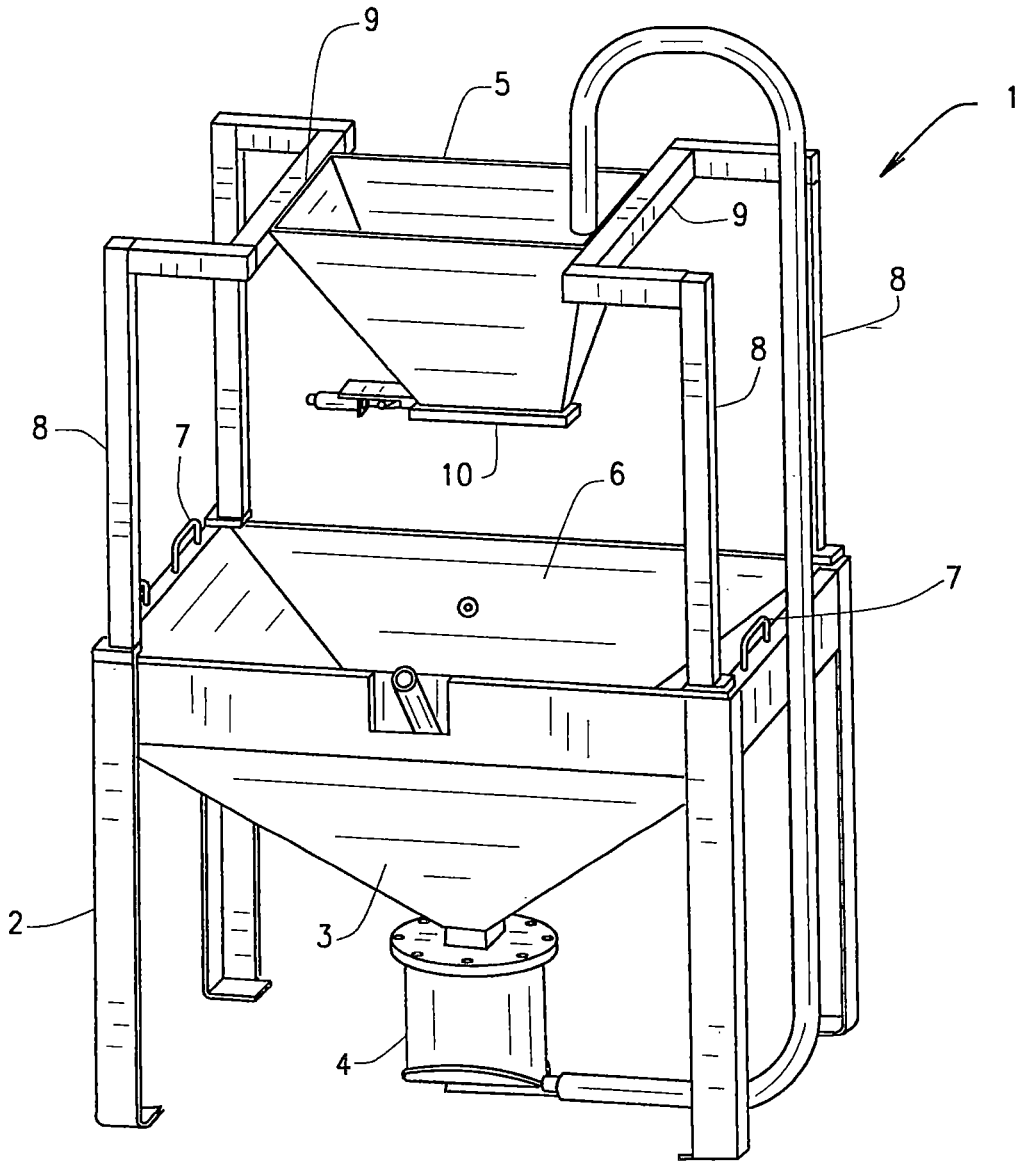
F I G . 1

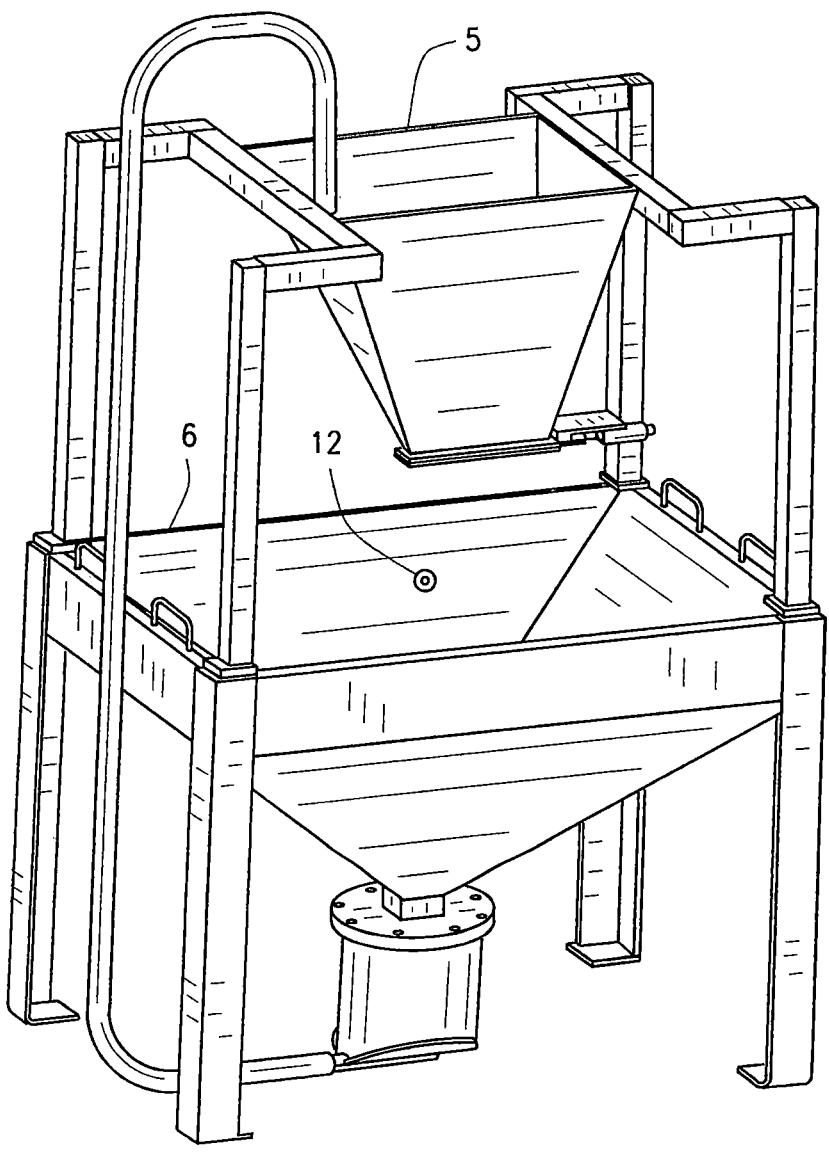
F I G . 2

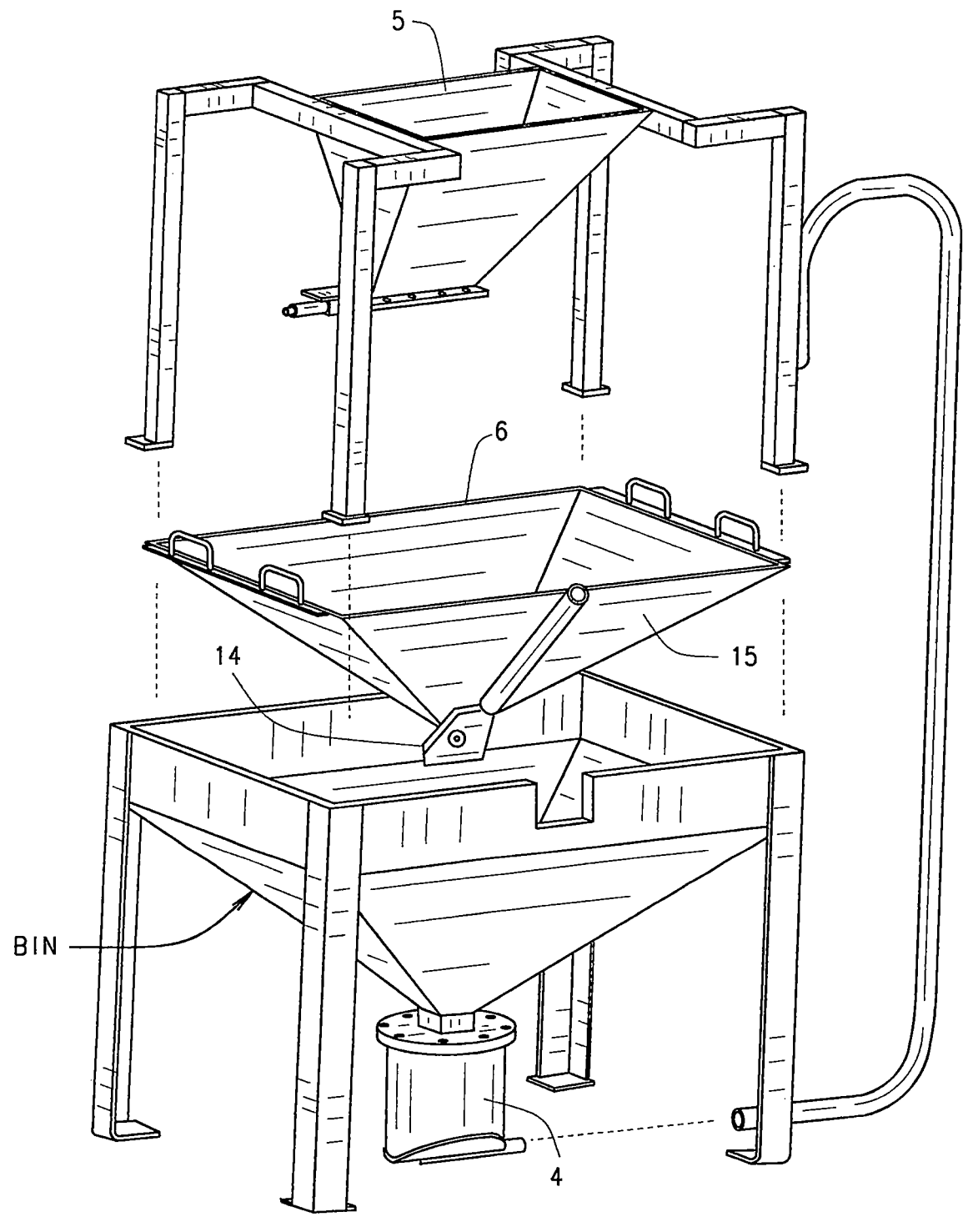
F I G . 3

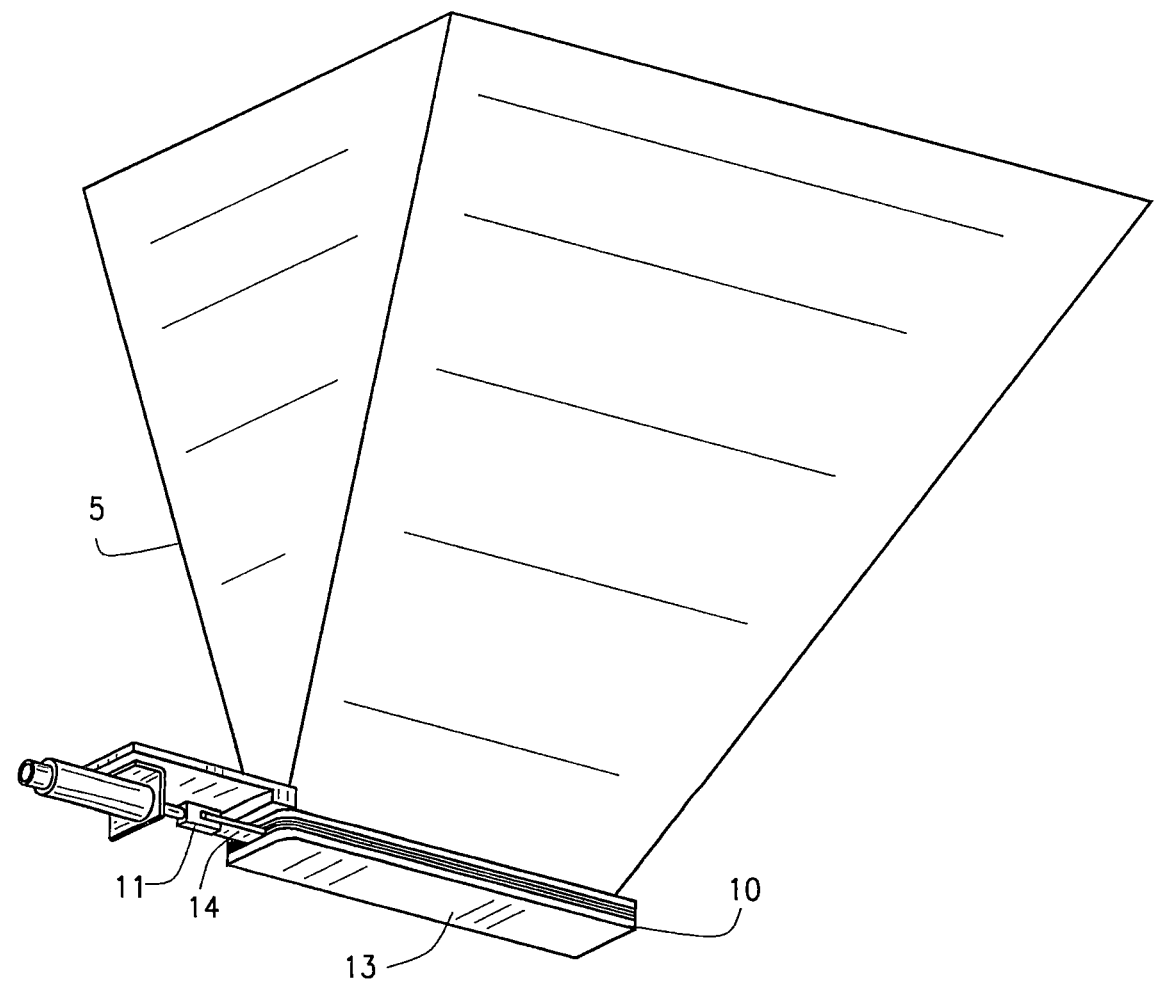
5
11
14
13
10
F I G . 4

VACUUM SUCTION

PATH A

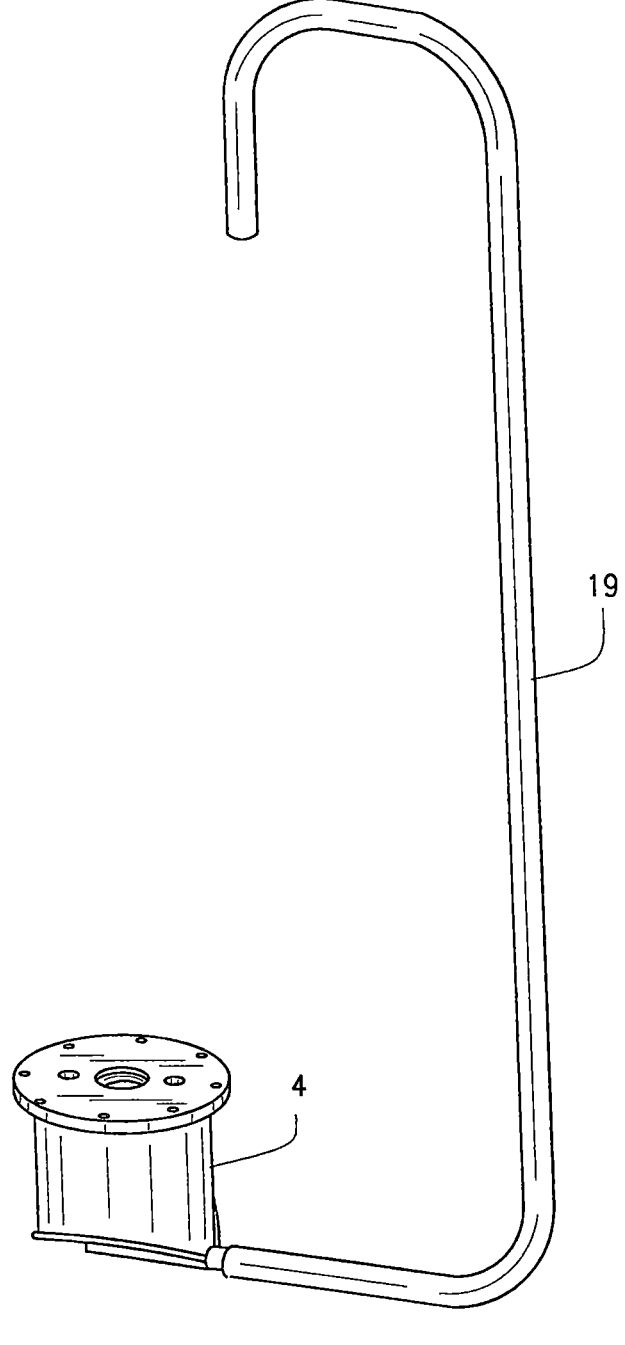
F I G . 6

SHOT CASCADING APPARATUS FOR CLEANING 3D PRINTED COMPONENTS

CROSS-REFERENCE TO RELATED APPLICATION

This application is a regular letters patent application which is the non-provisional continuation of the provisional patent application having Ser. No. 63/372,998 and filed on Apr. 19, 2022.

FIELD OF THE INVENTION

This invention relates to 3D printed components, and more particularly to an apparatus for cleansing the surface impurities or debris that remain after the printing process, through the application of the shot cascading apparatus.

BACKGROUND OF THE INVENTION

The concept of this invention is to provide an apparatus for utilizing a mild form of shot depositing device, of metallic, ceramic, or other pellets, for use as cleaning components that have been prepared by 3D inkjet printing, such printing which can be achieved through the use of the 3D additive manufacturing processes, so that the finished product can be readily observed, free of any accumulated surface debris, after preparation by the printing process.

Inkjet printing has been in existence since approximately the early 1970's. Essentially, it is the reproduction by way of inkjet printers that can reproduce digital images generated by computer and provide the preparation of models or components that the user wishes to see from the standpoint of effectiveness, operative ability, aesthetics, before any final commercial product is developed or manufactured. In such printing, it is the application of what is generically called an ink, but which may comprise various chemicals in the form of ink, paste, and printing liquids, and which may be fortified with filling materials, such as solder paste, silica and silicates, and other types of materials or chemical ingredients that can add to the viscosity of the printing material, in order to build up the three dimensional aspects of the product being formed, through such inkjet printing process and procedures.

Early commercial devices included patents, such as U.S. Pat. No. 2,566,443, by Rune, which shows the use of means for providing a continuous tracing on paper using inkjet nozzle during its functioning.

Various other patents have been obtained, such as Pat. No. U.S. Pat. No. 3,596,285, where the preferred ink used was characterized by viscosity and surface tension characteristics that allow the applied material to form a liquid mass, in creating a particular design of product, sought through the digital printing method.

U.S. Pat. No. 5,136,515, shows another form of a 3D printer method. Various types of what are identified as inks, whether they be solvent inks, organic chemical compounds having high vapor pressures, and which has the desired viscosity, such as through the addition of silicon to the compound, that adds signification volume to the application of the liquid, to the receptive surface, in order to formulate and print the digitized product.

Various other U.S. patents that show related compounds, can be seen in U.S. Pat. No. 3,596,285, and miscellaneous other related United States patents.

Where silica is an additive to the fluid being jet printed, when the finished product is formed, it has a soft granular surface, of the formed model, that needs to be removed in order to achieve the finished model, of the desired product. Heretofore, it was common practice to use a brush, or other soft textured cleaner, that could be used to wipe the surface of the formed printed product, but if one is not careful in performing that procedure, the actual desired surface part of the formed product could also be removed, if too much pressure was applied during the cleansing process.

Hence, the concept of the current invention is to provide a precisely functioning apparatus, that applies just the right amount of steel, other metal, or ceramic beads, within a range of deposit, through what is identified as a shot cascading procedure, to the formed product, in order to effectively remove that surface content from the model, to complete its finishing.

SUMMARY OF THE INVENTION

This invention generally relates to the surface cleaning of a formed or cast product, usually one that is to function as a model for a potential commercial product, and more specifically pertains to the cleansing of the surface of the printed formed product, generally deposited by the 3D inkjet printing method, to form such a model of the desired product.

In the formation of the jet printed product, the viscosity of the liquid deposited ingredient that is built up into a three dimensional model, is rather essential. Usually, some form of filler material, that enhances the viscosity of the liquid or ink being deposited, will include a viscosity enhancing ingredient that allows for the build up of the forming product, through the inkjet printing method. One such ingredient, as previously stated, is the use of a silica, such as silicone, or fine sand, that is used in the formation of the desired design, which is generally deposited through the control of a computer, that regulates the deposit of the liquid material through the digital control of such a computer, in the printing of the formative model. When such a product is formed, the silica aspects of the product generally leaves a gritty type surface upon the formed product, that needs to be removed, so that the actual product as printed can be achieved, to provide that finished product desired by the applicant, through usage of such a printing process. That particular sandy surface needs to be removed, and can be attained by a variety of methods, such as through brushing, wiping, but the preferred embodiment provided herein is the usage of an apparatus that functions as a shot cascading device, depositing pelletized metal or ceramics or related materials onto the surface of the formed product, at just the proper pressure, volume, and quantity, in order to remove the gritty surface, and end up with the desired product through usage of this method. There are other support materials that are used in the 3D printing, and which forms a bed of the aggregate type of medium, in this case, silica sand, which is a support type material that partially adheres to the part of the surface and requires cleansing The apparatus of this invention includes a machine base that forms a contoured collecting bin for the shot material being deposited onto the apparatus, and then has located therein a funnel like member that mates within the machine base, and upwardly of these assembled components is the shot supply hopper, in which the shot is deposited, and then discharged by gravity onto the product to be cleaned, during its functioning.

The shot supply hopper, upon actuation, includes a shot gate that opens to allow for a series of streams for falling of the steel shot media, downwardly, by gravity, onto the formed printed product held either by hand, or by other holding instrument, within the path of the falling shot, in order to attain that surface cleaning as desired. The uncleaned 3D printed sand piece is held within the shot stream, and rolled around or moved in all angular directions, to position eventually all surfaces of the product within the falling shot stream. The falling a cleanser shot media delivers the loose sand, within the 3D printed support material, off the surface of the part, thereby quickly performing the gross depowdering process without the need for any brushes, vacuum, or air blast, through labor or human participation, when cleansing the product surface. The shot media primarily used, in this embodiment, is the S230 steel shot. That particular shot has an average diameter, per particle, of around 0.025 in., and has been found most effective in cleansing most of the inkjet printer models, as formed. The bottom of the shot supply hopper includes a pneumatic cylinder that actuates the shot gate on the hopper, and that shot gate uses eleven ½ in. diameter holes to drop the shot media at an approximate rate of 18.5 lbs./min. (1.5-2 lbs./min. per hole) downwardly upon the positioned product, to achieve its cleansing. This gate can also be formed of various designs, that provides for a metered dispensing through gravity at the shot medium downwardly upon the position product. It has been found that utilizing a pneumatic-actuated rubber bladder, as the shot gate, that provides for the opening of the shot gate, to dispense shot media for cleaning purposes. Larger size shot may be used to clean larger sized components, however, the system is most beneficial for smaller, detailed components, that have been formed by the inkjet printing process, and need to be cleaned to their desired dimensions. The rate of delivery, the size of the shot, and the time for holding the printed product under the shot gate, will vary depending upon the size of the product, but usually a time period of thirty seconds to four minutes has been found most effective, for small printed products through this method. Also, the variable tolerance for these parameters for the apparatus and its operations may be plus or minus five percent.

The machine base for the apparatus also includes a bin like member. And, within the bin like member is a funnel arrangement, rather complementary of insertion into the machine base and its bin, and the supplied shot, following cleansing, falls into the funnel, and out of its bottom into the bin of the machine base, where there is a cleansing and separation of the steel or ceramic shot, from the removed sand ingredient, as to be explained.

Upon the funnel is mounted, at its bottom exit point, a sand separator nozzle. That nozzle connects with a suction tube, to a vacuum source, and when the combined shot, and the removed sandy ingredient, exit from the bottom of the funnel, the sand separator nozzle allows the steel shot to bypass said separator, but the lighter weight sand ingredient is sucked into the nozzle, by way of its suction tube, and delivers the separated sand to another collection point, where it can be cleansed and reused for further inkjet printing, of other components. At the same time, the separated and collected shot, that drops downwardly within the bin of the machine base, is collected by a recycle pump, and is pumped through a shot recycle conduit, and back up into the shot supply hopper, for further and continuous usage, for further cleansing of formed product, during application of this apparatus.

The bottom of the previously defined shot supply hopper includes a pneumatic cylinder or a pinch bladder, as known in the arts, that actuates the shot gate, on demand, and upon its actuation, the shot gate opens to allow a series of streams of falling steel shot media, to be used for the cleansing purposes. The uncleaned 3D printed piece is held in the shot stream, below the hopper, and moved or rolled around to position all surfaces within the shot stream, as previously reviewed.

The mixed sand and shot from the printed part during a cleansing drops such mixture to the bottom of the funnel, that cascades over the top of the sand separator nozzle. The heavier steel shot media passes over the nozzle and cascades downwardly into the machine base, and into the shot recycle pump maintained below the machine base, to posture it for recycling. The relatively light weight sand, removed from the surface of the cleansing product, is drawn into the suction path of the sand separator nozzle, is collected in the formed vacuum, and is vacuumed out of the apparatus and to another area for collection. That sand ingredient can be cleansed and reused, for further inkjet printing.

The clean metallic or ceramic shot which is deposited at the bottom of the machine base for the apparatus, is removed by the shot recycle pump, which is cyclically controlled below for a preset time, and then the shot material is pumped back to the shot supply hopper, at the top of the apparatus, for a preset time for repeat usage.

Thus, all the operator needs to do is initiate the operations of the apparatus, which allows for the controlled discharge of the shot material from the supply hopper, deposit the same by gravity onto the held component to be cleaned, and then the apparatus completes the cycle by allowing the steel shot to fall downwardly into the machine base for pumping back into the hopper for recycling, while at the same time, the sand separated from the component is vacuumed into the nozzle at the bottom of a funnel, and through its suction tube for collection at a nearby location.

It is, therefore, the principal object of this invention to provide for the automation, through the use of a shot delivering means, to cleanse a jet printed and formed component, without any further manual participation other than simply holding the component within the stream of the shot tower, during its usage.

Another object of this invention is to provide a shot delivering apparatus that is regulated as to time, shot flow, using a shot within a particular weight range, and depositing through the application of gravity to cleanse an ink jet printed component, without any further manual participation.

Still another object of this invention is to provide and simplify the method for cleansing of an inkjet printed component or model.

A further object of this invention is to provide a quick method for cleansing a printed component, under controlled conditions, that allow for the desired printed product to attain its determined dimensions in preparation for further testing and usage.

These and other objects may become more apparent to those skilled in the art upon review of the Summary of the Invention as provided herein, and upon undertaking a study of the Description of its Preferred Embodiment, in view of the drawings.

BRIEF DESCRIPTION OF THE DRAWINGS

In referring to the drawings,

FIG. 1 is a front isometric view of the shot cascading apparatus of this invention;

FIG. 2 is a rear isometric view of the shot tower apparatus;

FIG. 3 is an isometric view of the exploded structures forming the shot delivering apparatus of this invention;

FIG. 4 is a view of the shot supply hopper, with the pneumatic operative shot gate at its bottom for controlled delivering the shot stream by gravity downwardly therefrom;

FIG. 6 shows the separated shot that deposits within the machine base and the pump for recycling the shot back into its supply hopper, for reusage.

DESCRIPTION OF THE PREFERRED EMBODIMENT

Figure 5A:
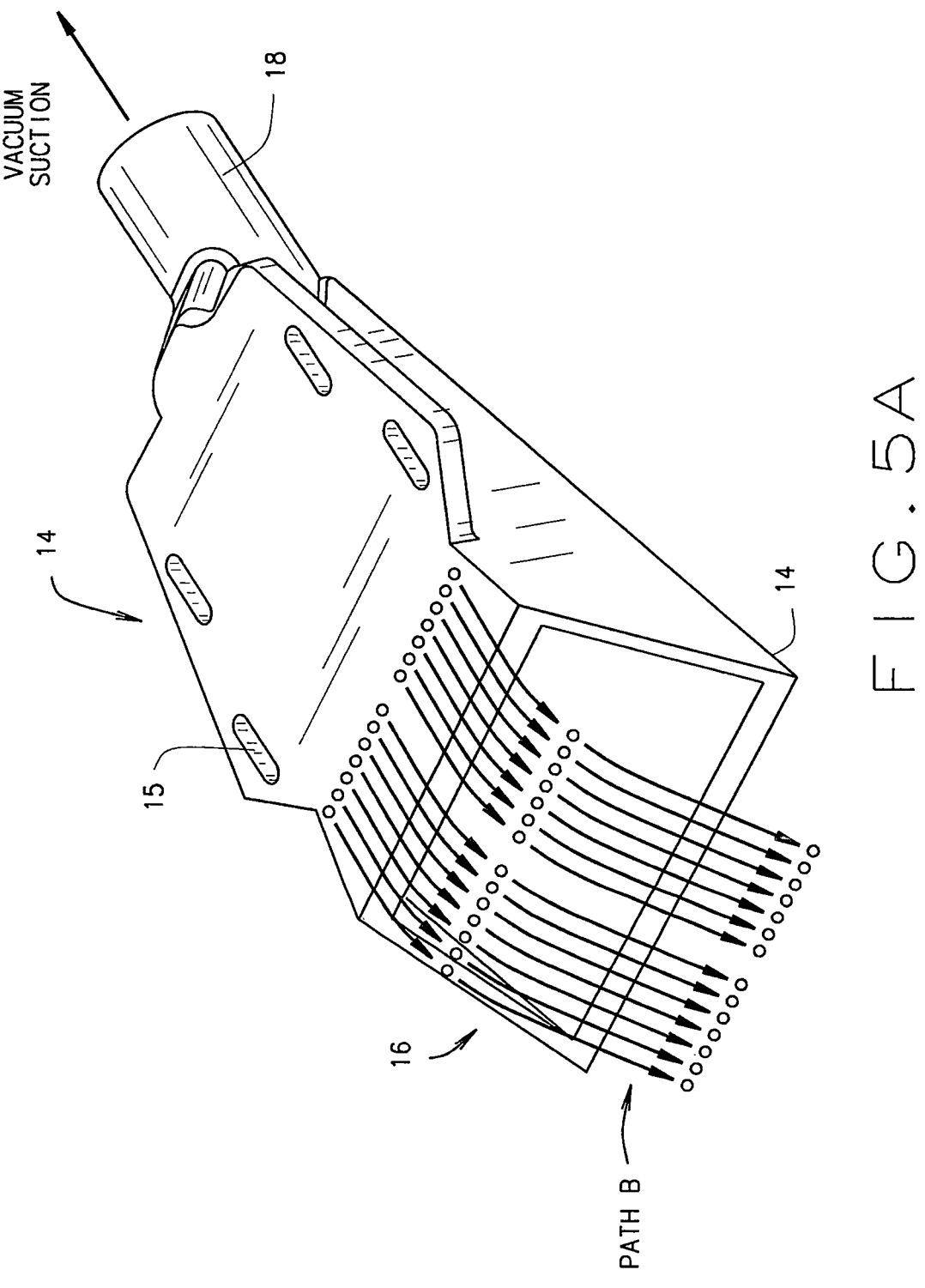
FIG. 5 is an isometric view of the sand separator nozzle which is applied to the funnel structure of the apparatus, and showing a path for flow of the deposited shot, and surface removed sand, for the apparatus.
FIG. 5b is a perspective view of the sand separator nozzle and disclosing the removal of the deposited light weight sand that is drawn in by vacuum from the apparatus.
Figure 5B:
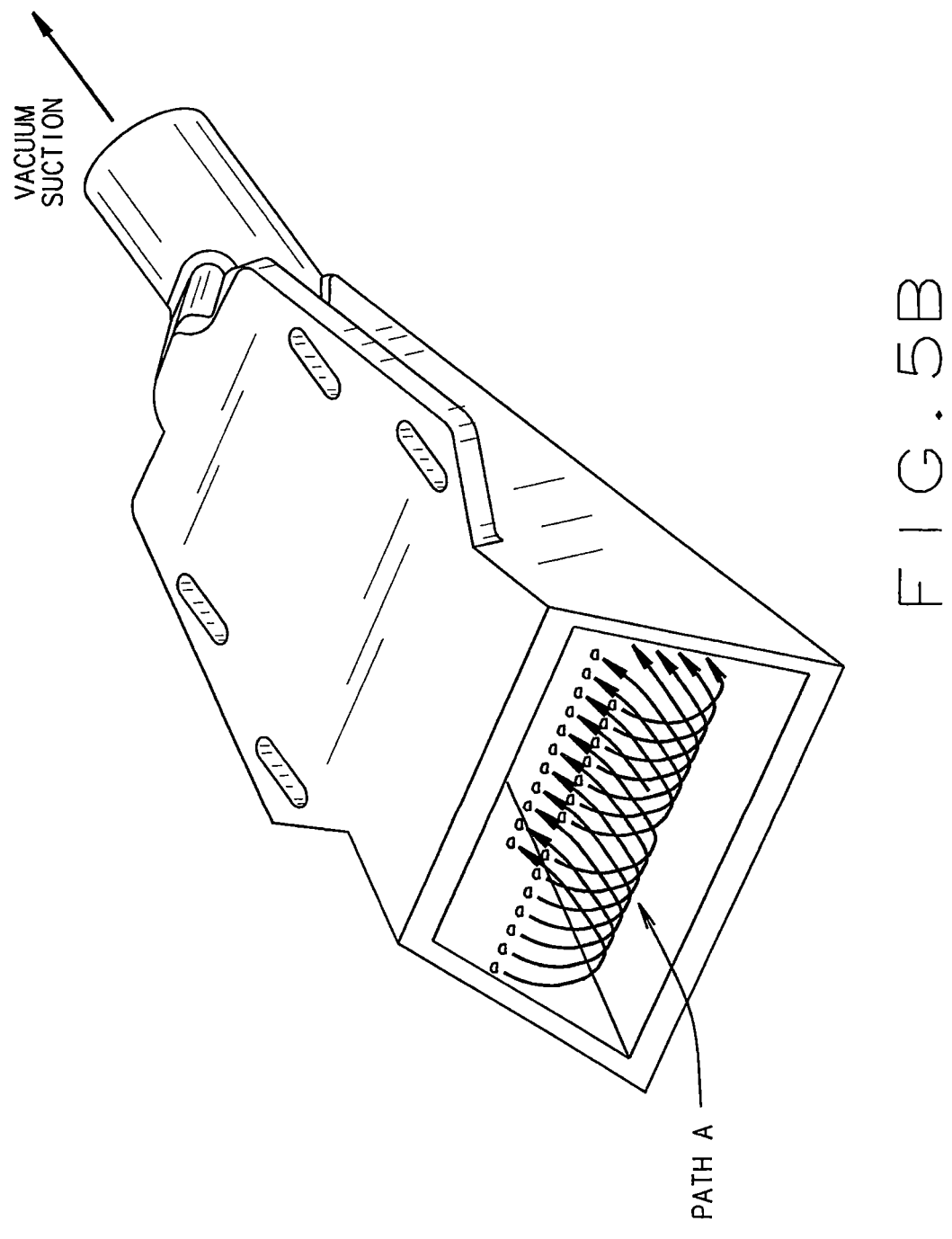

As previously summarized, the concept of this invention is to provide a shot cascading apparatus for use for cleaning 3D printed components. As stated, this invention is designed to provide just the right and proper amount of shot, whether it be of the metallic type, ceramic, or other pelletized materials, at a proper flow rate, applying a range of pressure upon the printed product, so as to eliminate the surface granular material, usually silica, from the product, so that the finished product can be readily observed, handled, processed, to determine physical structure and aesthetics of the product, when they may be used to cast or mold in abundance the finished products for commercial use, application, or sale.

As can be noted, in FIG. 1, the shot cascading apparatus 1 of this invention is readily disclosed. This is a front view of the apparatus, and it includes a series of generally vertically aligned structures, in the form of a machine base 2 that includes a supported bin 3 and which is designed for resting upon the ground surface, during usage and application. Sufficient clearance is provided between the bottom of the bin 3, and the shot recycle pump 4 that is useful for returning the spent shot back to its shot supply hopper 5 for reuse and in preparation for further cleansing of the printed product, during usage. Located within the bin 3 is a funnel like arrangement 6, added somewhat nested within the bin, as noted, and leaving some space between the bottom of the funnel, and the bottom of the bin 3, for locating other operative components of this apparatus, as will be described. As noted, the funnel 6 has a series of handles, as at 7, to provide for its lifting and removal from the bin 3, as becomes necessary for servicing or cleaning out of the apparatus.

It can be seen that there is further structural support, as at 8, and lateral support 9 for holding the hopper 5 in position vertically above the combined funnel and bin of the apparatus.

At the bottom of the hopper 5 is located a gate mechanism 10, as also seen in FIG. 4, and this particular gate mechanism may be pneumatically, manually, or electrically operated, in order to provide for shifting, through its lever arrangement 11 for opening fully or partially, or closing, the shot supply hopper 5, as may be necessary during the operations of this apparatus.

As previously reviewed, the hopper is designed for functioning as a shot gate, which when opened, allows a series of streams of falling steel or other material shot media downwardly, by gravity, and to impact upon the positioned printed component, to provide for its surface cleansing.

Generally, as can be seen in FIG. 2, there is a substantial spacing between the bottom of the hopper 5, and the upper edges of the funnel 6, generally as noted at 12, and it is in this location where the operator may hold the printed component, directly in the falling path of the steel shot media, falling by gravity out of the hopper 5, in order to provide for an abrasive cleansing of the surface residue deposits of the silica or sand aspects of the print material forming the component, which, as desired, will only remove that surface content of the sand, and, not imbed in any way into the actual formed component itself, which desires to be fully preserved for further usage in the development of a particular commercial product, as desired. For example, the printed component may comprise the housing body of, for example, a gasoline dispensing nozzle, which eventually will be molded from aluminum, or other metal, and the predeveloped product can be inkjet printed through methods as previously described, and known in the art, so that an example and idea of the product configuration of the desired nozzle, can be readily observed, before the model component may be used, as for forming the mold, for casting of commercial products, when forming the gasoline dispensing nozzle housing for marketing. The operator may even hold the product for cleansing, within that spacing 12, or make use of other type of grasping instrument for supporting it within the stream of the falling shot media, during a cleansing process. The operator can readily observe when the component is fully cleaned, upon its surface, because of the openness of the apparatus, during its usage and operation, when the component is held in that spacing 12, while performing a surface cleansing process.

The bottom of the shot gate 10 may have a series of openings, along its bottom surface 13, and the slide portion 14 of the shot case cylinder 11, has a series of openings, which can be shifted into alignment fully or partially with the openings at the bottom of the said gate 13, to control the amount of shot being discharged, from the hopper, during its functioning.

As can also be seen in FIG. 3, there is a sand separator nozzle 14 operatively associated with the bottom of the funnel 6, and this funnel is connected with a suction tube 15 to which is vacuum source is applied, and functions as follows:

As can be seen in FIG. 5a, the nozzle 14, which is secured by fasteners, located through the openings 15, to the lower sloping side of the shown funnel 6, has an extending portion 16 that locates beneath the bottom opening of the funnel 6, and the combined mixed sand, removed from the surface of the component being treated, and the metallic shot, drop to the bottom of the funnel, and cascades over the upper frontal surface of the separator nozzle, generally as indicated by the flow path B, which exposes the mixed sand and shot to the lower opened end 17 of the nozzle, during its operations. The suction tube 15 connects with the integral fitting 18 at the upper end of the shown nozzle 14, and when the nozzle is operative, the heavier steel shot portion of the abrasive cleaner will fall downwardly from the lower edge of the shown nozzle, as noted by the path B, because the steel shot is of heavier consistency than the combination of the mixed sand and shot, while at the same time, the suction from the tube 15 will pull the relatively light weight sand and draw it into the nozzle, as noted through the schematic of path A, and return the sand back to a area for collection, and reuse, in the component forming process. Thus, as can be readily understood, the heavier steel shot will fall off the end of the nozzle, while the relatively light weight sand is pulled back into the nozzle, for transfer, and collection, for reusage.

Usually this type of granular material is relatively expensive, and its cleaning and reusage is encouraged, from a cost standpoint.

On the other hand, since the steel shot falls to the bottom of the funnel, and down into the bin 3, it locates, by gravity, at the bottom end of the bin, and falls into the shot recycle pump 4, where it, likewise, is collected, and transferred through a shot recycle conduit 19 back to the top of and discharged into the shot supply hopper 5, for reapplication for a continuous cleansing process of the components being cleaned.

The foregoing provides an example and an analysis of the structural components that make up the assembly of this shot cascading apparatus, and how it can, be continuously used for cleaning components formed upon the inkjet printer, through a procedure that has previously been reviewed herein, and which has been known for many years, in the art.

Variations or modifications of the subject matter of this invention may occur to those skilled in the art upon review of the development as explained herein. Such variations, if within the spirit of this invention, are intended to be encompassed within the scope of any claims to patent protection issuing upon this development. The Summary of the Invention as provided herein, and its explanation as the preferred embodiment, and as depicted in the drawings, is generally set forth for illustrative purposes only. Such variations, if within the concept of this invention, are intended to be encompassed within the scope of any claims to patent protection issuing upon this invention.

We claim:

1. A shot cascading apparatus for use in surface cleaning of a component, comprising:

a base, said base holding a shot gathering bin below the component where the bin gathers falling shot and impurities after the component has been cleaned of its surface impurities such as silica;

a funnel, said funnel nesting within said bin held by the base and therein collecting the cascading falling shot and surface impurities after the shot impinging upon the component being cleaned, there being a spacing between a bottom of the funnel and a lower interior of the bin, a separator nozzle in the spacing between the bottom of the funnel and the lower interior of the bin configured for separating the shot from the surface impurities removed from the surface of the component being cleaned by the falling shot;

a shot supply hopper above the said funnel, and there being an open space between a bottom of the shot supply hopper and an upper edge of the funnel, the open space being configured to allow the component to be cleaned to be positioned from an exterior of the apparatus into the open space between the bottom of the shot supply hopper and the upper edge of the funnel and for holding the component to be cleaned in the open space in the falling shot from the shot supply hopper to attain surface cleansing of the component by the falling shot impacting upon the component in the open space, the open space also being configured to observe the component held in the open space during cleaning of the component by the falling shot;

a gate mechanism at the bottom of the shot supply hopper, the gate mechanism being operative to adjustably open and drop a stream of shot from the shot supply hopper and the gate mechanism downward by gravity out of the shot supply hopper, and whereby the combination of the shot supply hopper, funnel, and shot bin being spaced vertically with respect to each other with the shot supply hopper and the gate mechanism spaced by the open space above the funnel to provide for the positioning of the component to be cleaned under the shot supply hopper and in the open space, allowing the funnel to collect the combined shot and surface impurities cleaned from the component, and as the shot and impurities fall into the bin, the separator nozzle being configured to separate the surface impurities from the shot, the latter which falls into the bin for further collection.

2. The shot cascading apparatus of claim 1, wherein the shot supply hopper includes a shot gate provided on the gate mechanism and configured to adjust a quantity of the shot being delivered from the shot supply hopper for falling onto the positioned component to attain its surface cleansing.

3. The shot cascading apparatus of claim 2, wherein said separator nozzle is vacuum operative, and draws in by vacuum the removed surface impurities such as silica while allowing the heavier shot to fall into the bin during its collection.

4. The shot cascading apparatus of claim 3, and a shot recycle pump provided underneath the located bin, wherein a pump is located underneath the bin and is operable for pumping the gathered shot through a recycle conduit for deposit into the shot supply hopper for reuse in the surface cleansing of further components.

5. The shot cascading apparatus of claim 4, wherein the provided shot is steel shot, and the dominant surface impurities removed from the component comprise silica.

6. An apparatus for cleaning a product, the apparatus comprising:

a hopper, the hopper having an interior volume that is configured for storing a supply of shot;

a gate mechanism in operative communication with the supply of shot stored by the hopper, the gate mechanism being configured for dispensing shot in a stream from the hopper;

a funnel positioned beneath the gate mechanism;

an open space adjacent the gate mechanism between a bottom of the hopper and an upper edge of the funnel, the open space being positioned relative to the gate mechanism and being configured for positioning a component to be cleaned by falling shot into the open space and for holding the component to be cleaned in the open space in the stream of falling shot to surface clean the component by the falling shot impacting upon the component in the open space, the open space also being configured to observe the component held in the open space from an exterior of the apparatus during cleaning of the component by the falling shot; and a separator nozzle positioned beneath the open space, the separator nozzle being operable to separate shot passed over the product from material removed from the product.

7. The apparatus of claim 6, further comprising:

the gate mechanism being configured to dispense shot solely by gravity in a stream pattern from the hopper.

8. The apparatus of claim 6, further comprising:

the gate mechanism being configured to adjustably vary a rate at which shot is dispensed in a stream from the hopper.

9. The apparatus of claim 6, further comprising:

a framework operatively connected to the hopper and the gate mechanism, the framework supporting the hopper and the gate mechanism above the open space.

10. The apparatus of claim 6, further comprising:

the funnel positioned beneath the open space to receive the stream of shot passing through the open space into the funnel.

11. The apparatus of claim 10, further comprising:

a shot recycling apparatus, the shot recycling apparatus positioned beneath the funnel, the shot recycling apparatus being configured to receive shot from the funnel and recycle the received shot to the hopper.

12. The apparatus of claim 10, further comprising:

the separator nozzle being operatively associated with the funnel and being configured to receive a mix of shot and material removed from the product by the stream of shot from the funnel and separate the material from the shot.

13. The apparatus of claim 12, further comprising:

the material is sand.

14. The apparatus of claim 10, further comprising:

a framework operatively connected to the hopper and the gate mechanism and the funnel, the framework supporting the hopper and the gate mechanism directly above the funnel with the open space above the funnel and beneath the hopper and the gate mechanism.

15. An apparatus for cleaning sand from a surface of a product formed by 3D sand and binder printing, the apparatus comprising:

a hopper, the hopper having an interior volume that is configured for storing a supply of shot;

a gate mechanism located beneath the hopper, the gate mechanism operatively communicating with the supply of shot stored in the hopper, the gate mechanism being configured to control a stream of the shot stored in the hopper to discharge from the hopper and from the gate mechanism;

an open space beneath the gate mechanism and beneath the hopper, the open space being configured for positioning a product to be cleaned by falling shot into the open space and beneath the stream of shot discharged from the hopper and from the gate mechanism and for holding the product to be cleaned in the open space in the stream of shot to surface clean the product by falling shot impacts with a surface of the product in the open space and thereby cleans sand from the surface of the product, the open space also being configured to observe the product held in the open space during cleaning of the product by the stream of shot; and a separator nozzle positioned beneath the open space, the separator nozzle being operable to separate shot passed over the product from sand removed from the product.

16. The apparatus of claim 15, further comprising:

a funnel, the funnel is positioned beneath the open space to receive the stream of shot discharged by the gate mechanism and passing through the open space into the funnel and to receive sand cleaned from the surface of the product into the funnel.

17. The apparatus of claim 16, further comprising:

a shot recycling apparatus, the shot recycling apparatus positioned beneath the funnel, the shot recycling apparatus being configured to receive shot from the funnel and recycle the received shot to the hopper.

18. The apparatus of claim 17, further comprising:

the separator nozzle is positioned beneath the funnel, the separator nozzle being configured to receive shot discharged from the hopper and impacted with the surface of the product in the open space and receive sand cleaned from the surface of the product and separate the sand from the shot.

19. The apparatus of claim 18, further comprising:

the separator nozzle being operatively communicated with a source of vacuum pressure whereby the source of vacuum pressure is configured to draw the sand away from the shot.

20. The apparatus of claim 18, further comprising:

a framework operatively connected to the hopper and the gate mechanism and the funnel, the framework supporting the hopper and the gate mechanism directly above the funnel with the open space above the funnel and beneath the gate mechanism.

* * * * *